US006799928B2

(12) United States Patent
Port-Robach

(10) Patent No.: US 6,799,928 B2
(45) Date of Patent: Oct. 5, 2004

(54) DEVICE FOR DETECTING WEAR OF A NUT IN A SCREW-AND-NUT ASSEMBLY

(75) Inventor: Isabelle Port-Robach, Deuil la Barre (FR)

(73) Assignee: TRW Systemes Aeronautiques Civils, St. Ouen l'Aumone (FR)

( * ) Notice: Subject to any disclaimer, the term of this patent is extended or adjusted under 35 U.S.C. 154(b) by 0 days.

(21) Appl. No.: 10/377,418

(22) Filed: Feb. 27, 2003

(65) Prior Publication Data

US 2003/0175090 A1 Sep. 18, 2003

(30) Foreign Application Priority Data

Mar. 1, 2002 (FR) .............................................. 02 02624

(51) Int. Cl.⁷ .......................... F16B 31/02; F16B 37/00
(52) U.S. Cl. .................. 411/14; 411/427; 116/208; 73/761
(58) Field of Search .......................... 411/8, 14, 427; 116/208, DIG. 34; 73/761

(56) References Cited

U.S. PATENT DOCUMENTS

| 4,630,490 A | * | 12/1986 | Malicki ..................... 411/14 X |
| 4,921,380 A | * | 5/1990 | Tronetti, Jr. ............... 411/14 X |
| 5,699,703 A | * | 12/1997 | Habele ....................... 73/761 X |
| 6,059,500 A | * | 5/2000 | Dirmeier et al. .............. 411/14 |

* cited by examiner

*Primary Examiner*—Neill Wilson
(74) *Attorney, Agent, or Firm*—Blakely Sokoloff Taylor & Zafman

(57) ABSTRACT

A screw-and-nut assembly comprising a support secured to the nut, which support is provided with a surface in contact with the thread of the screw, and an electrical sensing member responsive to mechanical interaction with the thread of the screw, the sensing member being placed in the support close to said surface to come into interaction with the thread of the screw in the event of said surface wearing, wherein the support and the nut are constituted by the same block of material, the sensing member thus being placed inside the nut.

10 Claims, 2 Drawing Sheets

DEVICE FOR DETECTING WEAR OF A NUT IN A SCREW-AND-NUT ASSEMBLY

The invention relates to detecting thread wear in screw-nut assemblies, and in particular in screw actuators.

More precisely, the invention relates to such detection when it is implemented by means of an electrical wear sensor.

BACKGROUND OF THE INVENTION

Detecting thread wear is an important concern, particularly when it seeks to give warning about a strength limit for the screw-and-nut pair.

Predicting possible breakage is a concern that is particularly strong in the field of screw actuators, i.e. systems in which a screw and a nut are caused to rotate relative to each other in repeated manner, for the purpose on each occasion of transforming such rotation into mutual thrust or traction.

More generally, wear detection seeks to indicate that the screw-and-nut pair is operating in a manner considered to be normal.

Document SU 1 490 586 describes a probe placed in a ring having the same diameter as the nut, and secured thereto in a position on the same axis, the ring also bearing against the thread of the screw so that it is itself subjected to wear.

The electrical probe that responds to coming into contact with the screw is buried in the ring so as to become flush with the wear zone thereof. Excessive wear of the ring is considered as being indicative of the need to perform maintenance.

Nevertheless, that system remains unsatisfactory since the ring is complex to make and time consuming to put into position.

Furthermore, its reliability in measurement is insufficient.

OBJECT AND SUMMARY OF THE INVENTION

The object of the invention is thus to solve those drawbacks.

This object is achieved by means of a screw-and-nut assembly comprising a support secured to the nut, which support is provided with a surface in contact with the thread of the screw, and an electrical sensing member responsive to mechanical interaction with the thread of the screw, the sensing member being placed in the support close to said surface to come into interaction with the thread of the screw in the event of said surface wearing, wherein the support and the nut are constituted by the same block of material, the sensing member thus being placed inside the nut.

The invention also provides a screw actuator including such a screw-and-nut assembly.

The invention provides an actuator of the type including a screw, a primary nut transmitting the force of the actuator in normal operation, and a secondary nut that acts to take over the force of the actuator in the event of the primary nut failing, the pair formed by the screw and the secondary nut being in accordance with the above-specified definition.

BRIEF DESCRIPTION OF THE DRAWING

Other characteristics, objects, and advantages of the invention appear on reading the following detailed description made with reference to the accompanying drawings, in which.

MORE DETAILED DESCRIPTION

Figure 1:
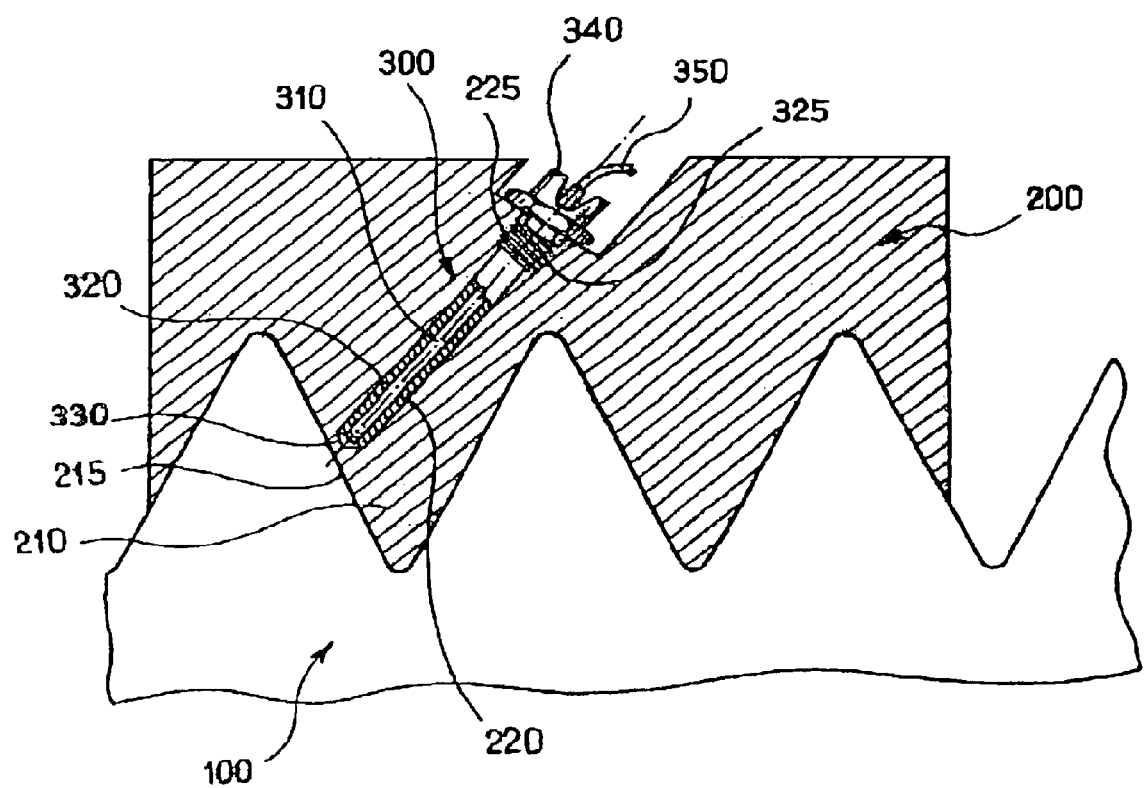
FIG. 1 is a fragmentary longitudinal section of a screw-and-nut assembly.
Figure 2:
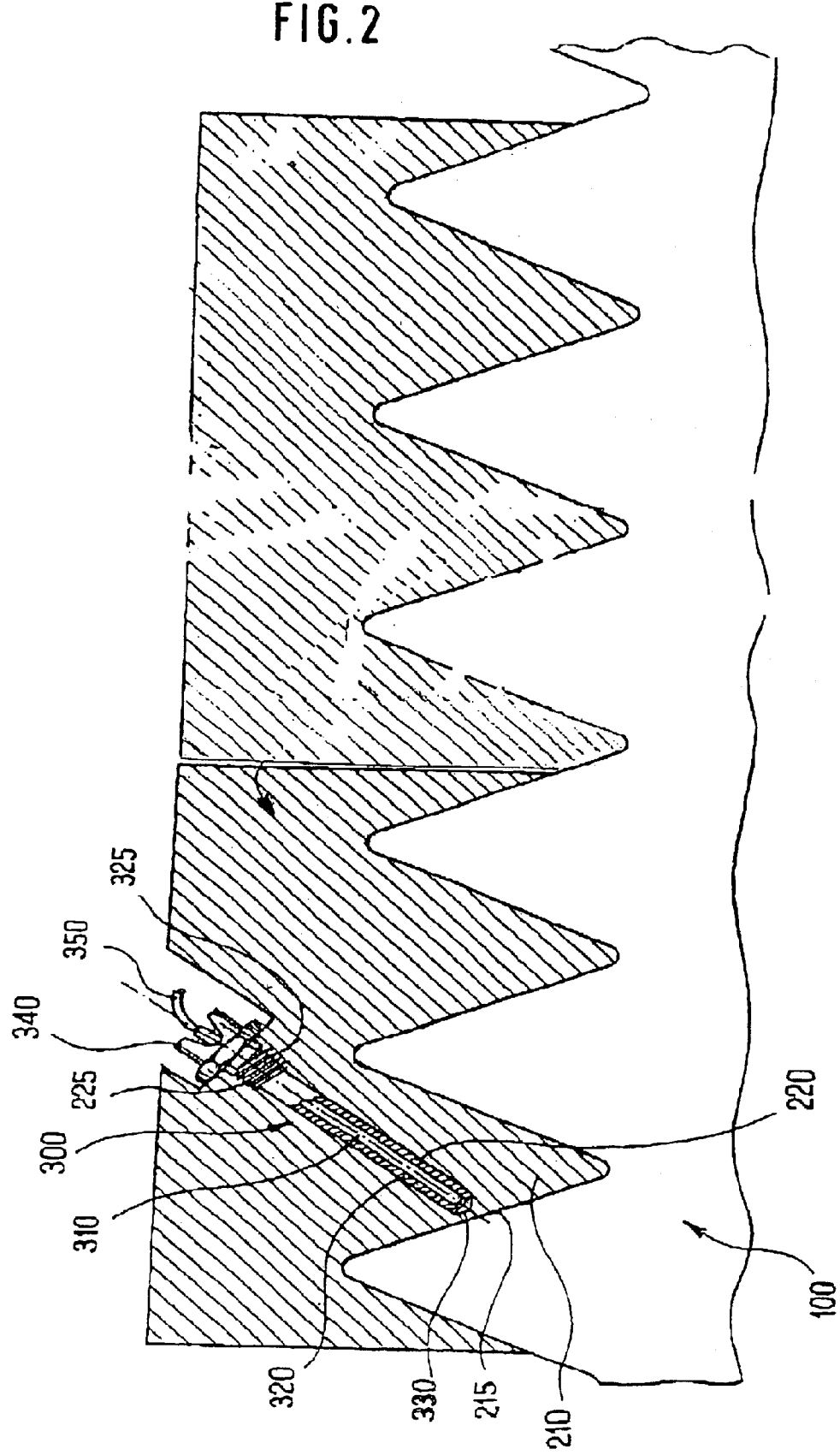
FIG. 2 is a fragmentary longitudinal section of a secondary nut of a screw-and-nut assembly.

The screw-and-nut pair shown in the accompanying figure forms part of a larger assembly (not shown) having the function of repetitively driving a load or a hinged element such as an airplane flap or aileron, for example. In this case, the screw 100 is rotated, thereby causing the nut 200 to move in translation, which nut is connected to the member to be displaced.

The accompanying figure shows more particularly a side portion of the screw 100 and of the nut 200 in question, with the remainder of the device being constituted by a conventional mechanical assembly.

The figure also shows a probe 300 for detecting thread wear, and more particularly wear of the thread of the nut 200. The probe 300 is an electrical probe including a conductive element 310 designed merely to detect contact between said conductor element 310 and the screw 100.

For this purpose, the probe 300 is connected to a first terminal of a source of electricity, and is surrounded by an insulating sheath 320 which is placed close to the screw in such a manner that the sheath 320 is itself subjected to wear.

Once sufficient wear has occurred, the conducting portion 310 of the probe 300 comes into contact with the screw 100. Since the screw 100 is connected to the second terminal of the source, the circuit as made in this way and that also presents means for detecting a flow of electricity, indicates that the conductive element 310 has come into contact with the screw 100.

The conductive portion 310 of the probe 300 forms a rigid finger, with the sheath 320 being constituted by a cap of plastic material having the same length as the conductive finger 310.

The probe 300 is placed within the nut 200.

In other words, it is the nut 200 which not only performs its main mechanical function of co-operating with the screw 100, but also carries the probe 300 within its own material.

As a result, when the probe is appropriately positioned, it is the thread of the nut 200 which is monitored for wear.

The probe 300 is therefore placed in such a manner as to extend to the direct proximity of a zone of the thread of the nut 200 that is to be monitored.

In the present example, the conductive finger 310 presents its end beneath the surface of one of the ribs 210 constituting the thread of the nut.

More particularly, the end of the finger 310 within the flank 215 of a rib 210 of the thread lies beneath the surface of the flank 215 and in direct proximity thereto.

When the conductive finger 310 comes into contact with the thread of the screw 100, that corresponds to a predetermined thickness being worn away from the rib of the thread 210.

In addition, the finger comes flush with the flank of said rib 210 halfway along up its height. Monitoring wear in this desired zone halfway up the rib of the thread 210 turns out to be particularly advantageous in indicating the general state of wear of the nut, since wear in this zone is faithfully representative of the general wear of the thread.

Wear is thus detected when it exceeds a threshold which is determined in advance by the position occupied by the tip 330 of the probe 300.

In practice, in the particular example given above, the tip 330 of the probe lies beneath a surface of the nut 200, which surface co-operates mechanically with the screw 100. Nevertheless, it is mainly the position of the tip 330 relative to the opposite face belonging to the screw 100 that defines the wear threshold beyond which detection occurs.

In a variant, the probe 300 may be designed to present a change in behavior only when its conductive portion has itself been worn beyond a certain threshold.

To come close to the flank of the rib 210, the probe 300 passes through the nut 200 from the circumferential outside surface thereof. The probe 300 emerges in this outside surface in the form of an enlarged head which is extended by an electrical connection wire 350.

The probe 300 lies in a radial plane of the screw-and-nut assembly while being directed obliquely relative to the main axis of the assembly. Thus, the probe 300 approaches the flank 215 of the rib 210 in a direction that extends transversely relative to the flank.

The probe 300 is shown as being in contact with the nut 200 over the entire extent of its sheath 320, however the probe is a separate piece which is received in a passage 220 that is preformed in the nut. This passage carries its own inside thread 325 that is complementary to thread 325 provided on the sheath so as to enable the probe to be screwed into place.

The head 350 of the probe 300 also forms an octagonal outline for engaging conventional screw-driving tools.

Advantageously, the outside surface of the nut 200 is countersunk so as to enable the head 340 of the probe to lie below said surface.

The invention presents a particular advantage for a device whose operating safety is closely monitored, for example screw actuators having two nuts provided thereon, a primary nut that is normally loaded and a secondary nut that is not loaded in normal operation, being subjected to force only in the event of the primary nut failing (a "fail safe" system).

The nut wear monitoring of the invention is advantageously implemented for monitoring the secondary nut.

Regardless of whether the secondary nut is loaded or not loaded (i.e. on standby) it can be guaranteed that it is ready to operate properly, thereby providing an increased level of safety to the assembly as a whole.

What is claimed is:

1. A screw actuator comprising a screw-and-nut assembly which nut is provided with a surface in contact with the thread of the screw, wherein the nut is also provided with an electrical sensing member responsive to mechanical interaction with the thread of the screw, the sensing member being placed in the nut sufficiently close to said contacting surface of the nut to come into interaction with the thread of the screw in the event of said contacting surface wearing, the electrical sensing element being mounted in the body of the nut and initially prevented from contact with any thread surface so that only after wear on the surface of the nut thread flank cuts away nut material and contact-preventing material of the nut, does the end of the electrical sensing member make contact with the screw thread surface.

2. A screw actuator according to claim 1, wherein the sensing member is embedded in a rib of the thread of the nut.

3. A screw actuator according to claim 1, wherein the sensing member is placed close to a surface forming the flank of a rib of the thread of the nut, so as to come into contact with the thread of the screw in the event of the thread of the nut wearing, contact being made through the flank of the rib of the thread of the nut.

4. A screw actuator according to claim 3, wherein the sensing member occupies a zone of the flank situated substantially halfway up a rib of the thread, in such a manner as to come into contact with the thread of the screw in the event of the thread of the nut wearing through said zone of the flank that is situated at half-height.

5. A screw actuator according to claim 1, wherein the sensing member includes a rigid conductive finger extending through the nut from a zone situated close to the surface of the nut that is liable to become worn, to a zone where it emerges from the nut in such a manner that an electrical connection can be made to the rigid finger where it emerges from the nut.

6. A screw actuator according to claim 3, wherein the sensing member includes a rigid conductive finger extending through the nut from a zone situated close to the surface of the nut that is liable to become worn, to a zone where it emerges from the nut in such a manner that an electrical connection can be made to the rigid finger where it emerges from the nut, and wherein the rigid finger extends in a direction such as to approach the flank of the rib in a direction that extends substantially transversely relative to the flank.

7. A screw actuator according to claim 5, wherein the nut is provided with a finger-receiving passage, which passage is preformed prior to receiving the finger, the finger and the passage being fitted with complementary threads.

8. A screw actuator according to claim 1, wherein the sensing member is constituted by a conductive element surrounded by an insulating sheath in such a manner that the conductive element comes into electrical contact with the screw only once the insulating sheath has been subjected to sufficient wear against the screw.

9. A screw actuator according to claim 8, including means for detecting when electrical conduction is established between the conductive element and the screw.

10. A screw actuator according to claim 1, the actuator being of the type including a screw, a primary nut transmitting the force of the actuator in normal operation, and a secondary nut that acts to take over the force of the actuator in the event of the primary nut failing, the sensing member being placed in the secondary nut.

* * * * *